Patented Mar. 7, 1933

1,900,442

UNITED STATES PATENT OFFICE

ERNEST F. GRETHER, OF MIDLAND, MICHIGAN, ASSIGNOR TO THE DOW CHEMICAL COMPANY, OF MIDLAND, MICHIGAN, A CORPORATION OF MICHIGAN

ACYL DERIVATIVES OF 4,4'-DIAMINO DIPHENYL OXIDE

No Drawing.    Application filed January 15, 1930. Serial No. 421,061.

The present invention relates to acyl derivatives of aromatic amino-ethers, and has regard more particularly to compounds of the foregoing character which are derived from 4,4'-diamino diphenyl oxide.

In medicine certain derivatives of para-amino phenol ethers have found a more or less extensive use on account of their antipyretic, antineuralgic and analgesic properties. The most important compounds of this type are the phenetidins, the latter being the acyl derivatives of para-phenetidin, or ethoxy-para-amino phenol. Examples of the foregoing are acetphenetidin, triphenin and lactophenin, which are, respectively, the acetyl, propionyl and lactyl derivatives of para-phenetidin.

I have found that similar derivatives of 4,4'-diamino diphenyl oxide may be prepared which possess therapeutic, as well as chemical, properties more or less analogous to those of the aforesaid para-phenetidin derivatives.

The relationship between 4,4'-diamino diphenyl oxide and para-phenetidin, and hence the acyl derivatives thereof, is seen from a comparison of their respective constitutional formulae, viz:—

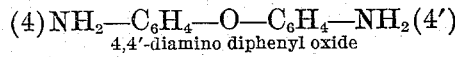
4,4'-diamino diphenyl oxide

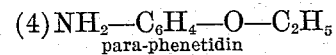
para-phenetidin

My invention comprises the new class of compounds formed by acylating one, or both, of the amino groups of the aforesaid 4,4'-diamino diphenyl oxide. I have found that such acyl derivatives may be prepared in the usual way by treating the diamino-ether with organic acids or the corresponding acid anhydrides. With the latter the reaction takes place without addition of heat, whereas when an acid is used refluxing for a time with heating to about 100° C. or higher, will generally be required to complete the reaction.

Example 1

The 4,4'-formyl-diamino diphenyl oxide is formed by refluxing the diamino-ether with an excess of formic acid. The solid product is precipitated in the reaction mixture as formed from which it is filtered and recrystallized from dilute, e. g. 50 per cent., alcohol. Fine colorless crystals, slightly soluble in hot water, insoluble in cold water. M. P. 154° C. Formula;

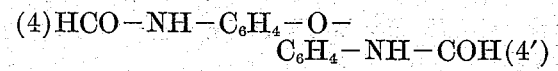

Example 2

The diacetyl derivative is formed similarly by treating the diamino-ether directly with acetic anhydride, or by refluxing with glacial acetic acid. Colorless, lustrous crystal flakes, slightly soluble in hot water. M. P. 228–229° C. Formula;

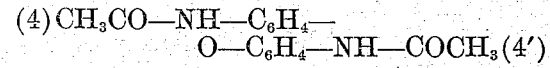

Example 3

The dipropionyl derivative is formed similarly by reaction with propionic anhydride or acid. Fine colorless silky needles, very slightly soluble in hot water. M. P. 253° C. Formula;

Example 4

The dilactyl derivative is formed by heating the diamino-ether with lactic acid. Fine colorless crystals, somewhat more soluble in hot water and dilute alcohol than the foregoing. M. P. 186° C. Formula;

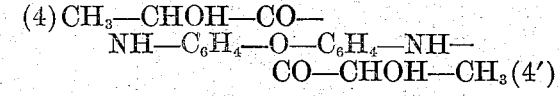

Instead of reacting 1 mole of the diamine and 2 moles of the acid, or equivalent anhydride, I may employ only 1 mole of the acid, or the equivalent amount of anhydride, in which case a mono-acyl, instead of a di-acyl, derivative will be obtained. Likewise other acyl derivatives may be formed by reacting with the corresponding aliphatic or aromatic acids or acid anhydrides, e. g. tartaric, citric, benzoic, phthalic acids and the like, as well as substituted derivatives thereof.

Other modes of applying the principle of my invention may be employed instead of those explained, change being made as to the materials employed, provided the compounds stated by any of the following claims or the equivalent of such stated compounds be obtained.

I therefore particularly point out and distinctly claim as my invention:—

1. As a new product, a compound having the following formula (4) acyl—NH—$C_6H_4$—
$\qquad$ O—$C_6H_4$—NH—X(4')

wherein X may be H or the same acyl group.

2. As a new product, 4,4'-diacylamido diphenyl oxide.

3. As a new product, a compound having the following formula (4) HCO—NH—$C_6H_4$—
$\qquad$ O—$C_6H_4$—NH—X(4')

wherein X may be H or the formyl group, HCO—.

4. As a new product, 4,4'-diformanido diphenyl oxide.

5. As a new product, a compound having the following formula (4) $CH_3$CO—NH—$C_6H_4$—
$\qquad$ O—$C_6H_4$—NH—X(4')

wherein X may be H or the acetyl group, $CH_3$CO—.

6. As a new product, 4,4'-diacetylamido-diphenyl oxide.

7. As a new product, a compound having the following formula (4) $CH_3$CHOHCO—NH—$C_6H_4$—
$\qquad$ O—$C_6H_2$—NH—X(4')

wherein X may be H or the lactyl group, $CH_3$CHOHCO—.

8. As a new product, 4,4'-dilactylamido-diphenyl oxide.

Signed by me, this 11 day of January, 1930.

ERNEST F. GRETHER.